United States Patent
Shmukler et al.

(10) Patent No.: US 10,750,436 B2
(45) Date of Patent: Aug. 18, 2020

(54) NEIGHBOR AWARENESS NETWORKING—DATA CLUSTER

(71) Applicant: Apple Inc., Cupertino, CA (US)

(72) Inventors: Maksim Shmukler, San Jose, CA (US); Lilach Zukerman, Pardesia (IL); Oren Shani, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/155,908

(22) Filed: Oct. 10, 2018

(65) Prior Publication Data

US 2019/0045431 A1    Feb. 7, 2019

Related U.S. Application Data

(62) Division of application No. 15/097,180, filed on Apr. 12, 2016, now Pat. No. 10,123,260.

(60) Provisional application No. 62/150,210, filed on Apr. 20, 2015.

(51) Int. Cl.
| | |
|---|---|
| *H04W 48/16* | (2009.01) |
| *H04W 72/12* | (2009.01) |
| *H04W 76/23* | (2018.01) |
| *H04W 72/04* | (2009.01) |

(52) U.S. Cl.
CPC ....... *H04W 48/16* (2013.01); *H04W 72/0406* (2013.01); *H04W 72/1205* (2013.01); *H04W 76/23* (2018.02)

(58) Field of Classification Search
CPC . H04W 8/005; H04W 40/246; H04W 40/248; H04W 40/32; H04W 48/16; H04W 72/1205; H04W 72/121; H04W 76/14; H04W 76/23; H04W 84/12
See application file for complete search history.

(56) References Cited

U.S. PATENT DOCUMENTS

| | | | |
|---|---|---|---|
| 7,024,483 B2 | 4/2006 | Dinker | |
| 7,720,054 B2 * | 5/2010 | Savage | H04L 43/00 370/389 |
| 8,139,528 B2 * | 3/2012 | Gupta | H04W 72/082 370/252 |
| 8,762,461 B2 | 6/2014 | Zhang | |
| 9,143,979 B1 | 9/2015 | Lambert | |
| 9,258,193 B2 | 2/2016 | Kasslin | |
| 9,313,641 B2 | 4/2016 | Abraham | |

(Continued)

*Primary Examiner* — Alpus Hsu
(74) *Attorney, Agent, or Firm* — Kowert, Hood, Munyon, Rankin & Goetzel, P.C.

(57) ABSTRACT

One or more wireless stations operate according to Neighbor Awareness Networking (NAN)—direct communication with neighboring wireless stations, e.g., direct communication between the wireless stations without utilizing an intermediate access point. In a NAN system, NAN devices may operate to establish a datapath and multiple NAN devices may operate with one another in the form of a NAN cluster to facilitate communications processes. Portions of the disclosure relate to systems and methods for one or more wireless device (e.g., NAN devices) to transition into a cluster (e.g., a NAN cluster). In particular, wireless devices, having established a datapath, may be further organized into a data cluster (e.g., a NAN data cluster) within a cluster, which may be usable to facilitate the transitioning of a group of connected wireless devices (e.g., data clusters) between clusters.

20 Claims, 5 Drawing Sheets

(56) References Cited

U.S. PATENT DOCUMENTS

| | | |
|---|---|---|
| 9,386,512 B2 | 7/2016 | Park |
| 9,432,925 B2 | 8/2016 | Kasslin |
| 9,439,089 B2 | 9/2016 | Deshpande |
| 9,439,147 B2 | 9/2016 | Huang |
| 9,503,961 B2 | 11/2016 | Oren |
| 9,544,754 B1 | 1/2017 | Lambert |
| 9,572,007 B2 | 2/2017 | Park |
| 9,723,513 B1 | 8/2017 | Lambert |
| 9,723,581 B2* | 8/2017 | Patil .................. H04W 52/0212 |
| 9,723,582 B1 | 8/2017 | Tran |
| 9,729,175 B2* | 8/2017 | Tang .................... H04W 24/10 |
| 9,769,645 B2* | 9/2017 | Patil ...................... H04W 8/005 |
| 9,787,704 B2 | 10/2017 | Danielson |
| 9,801,039 B2 | 10/2017 | Oren |
| 9,913,253 B2* | 3/2018 | Hareuveni ............ H04W 72/02 |
| 9,936,009 B2* | 4/2018 | Patil ........................ H04L 43/10 |
| 9,998,535 B2* | 6/2018 | Liu .................. H04L 29/08072 |
| 9,998,879 B2 | 6/2018 | Oren |
| 10,028,124 B2* | 7/2018 | Qi ....................... H04L 27/0006 |
| 10,080,182 B2* | 9/2018 | Kim ........................ H04L 67/16 |
| 10,080,184 B2* | 9/2018 | Huang ................. H04W 72/10 |
| 10,090,999 B2* | 10/2018 | Patil ...................... H04L 9/0833 |
| 10,091,811 B2* | 10/2018 | Huang ................. H04W 8/005 |
| 10,098,168 B2* | 10/2018 | Liu ....................... H04L 67/104 |
| 10,142,950 B2* | 11/2018 | Kim ........................ H04L 43/16 |
| 10,321,414 B2* | 6/2019 | Guo ..................... H04W 52/247 |
| 2007/0233835 A1 | 10/2007 | Kushalnagar |
| 2013/0136013 A1* | 5/2013 | Kneckt ............. H04W 74/0816 370/252 |
| 2014/0254426 A1 | 9/2014 | Abraham |
| 2015/0098388 A1 | 4/2015 | Fang |
| 2015/0109981 A1 | 4/2015 | Patil |
| 2015/0131529 A1 | 5/2015 | Zhou |
| 2015/0358800 A1 | 12/2015 | Park |
| 2016/0014669 A1* | 1/2016 | Patil .................... H04W 40/246 370/329 |
| 2016/0112986 A1 | 4/2016 | Patil |
| 2016/0150501 A1 | 5/2016 | Hui |
| 2016/0157089 A1 | 6/2016 | Qi |
| 2016/0212606 A1 | 7/2016 | Qi |
| 2016/0223333 A1 | 8/2016 | Thakur |
| 2016/0309462 A1 | 10/2016 | Huang |
| 2016/0309496 A1 | 10/2016 | Huang |
| 2017/0111849 A1 | 4/2017 | Park |

\* cited by examiner

NEIGHBOR AWARENESS NETWORKING—DATA CLUSTER

PRIORITY DATA

This application is a divisional application of U.S. patent application Ser. No. 15/097,180, titled "Neighbor Awareness Networking Data Cluster", filed Apr. 12, 2016 by Maksim Shmukler, Lilach Zukerman, and Oren Shani, which claims benefit of priority to U.S. Provisional Application Ser. No. 62/150,210, titled "Neighbor Awareness Networking Data Cluster", filed Apr. 20, 2015 by Maksim Shmukler, Lilach Zukerman, and Oren Shani, each of which is hereby incorporated by reference in its entirety as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems, Wi-Fi mobile stations are able to communicate directly with each other without using an intermediate access point. However, improvements in the operation of such devices are desired, such as in setup and coordination of the communication between such devices.

SUMMARY

Embodiments described herein relate to coordinating direct communication between wireless stations (or peer devices) and neighboring wireless stations.

Embodiments relate to a wireless station that includes one or more antennas, one or more radios, and one or more processors coupled (directly or indirectly) to the radios. At least one radio is configured to perform Wi-Fi communications. The wireless station may perform voice and/or data communications, as well as the methods described herein.

In some embodiments, one or more wireless stations operate according to Neighbor Awareness Networking (NAN)—direct communication with neighboring wireless stations, e.g., direct communication between the wireless stations without utilizing an intermediate access point. In a NAN system, multiple NAN devices may operate with one another in the form of a NAN cluster to facilitate communications processes. Some embodiments of the disclosure relate to systems and methods for one or more wireless devices (e.g., NAN devices) to transition into a cluster (e.g., a NAN cluster). In particular, wireless devices may be further organized into one or more data clusters (e.g., a NAN data cluster) within a NAN cluster, which may be usable to facilitate the transitioning of a group of connected wireless devices (e.g., a data cluster) between clusters.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:
UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™ PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1:
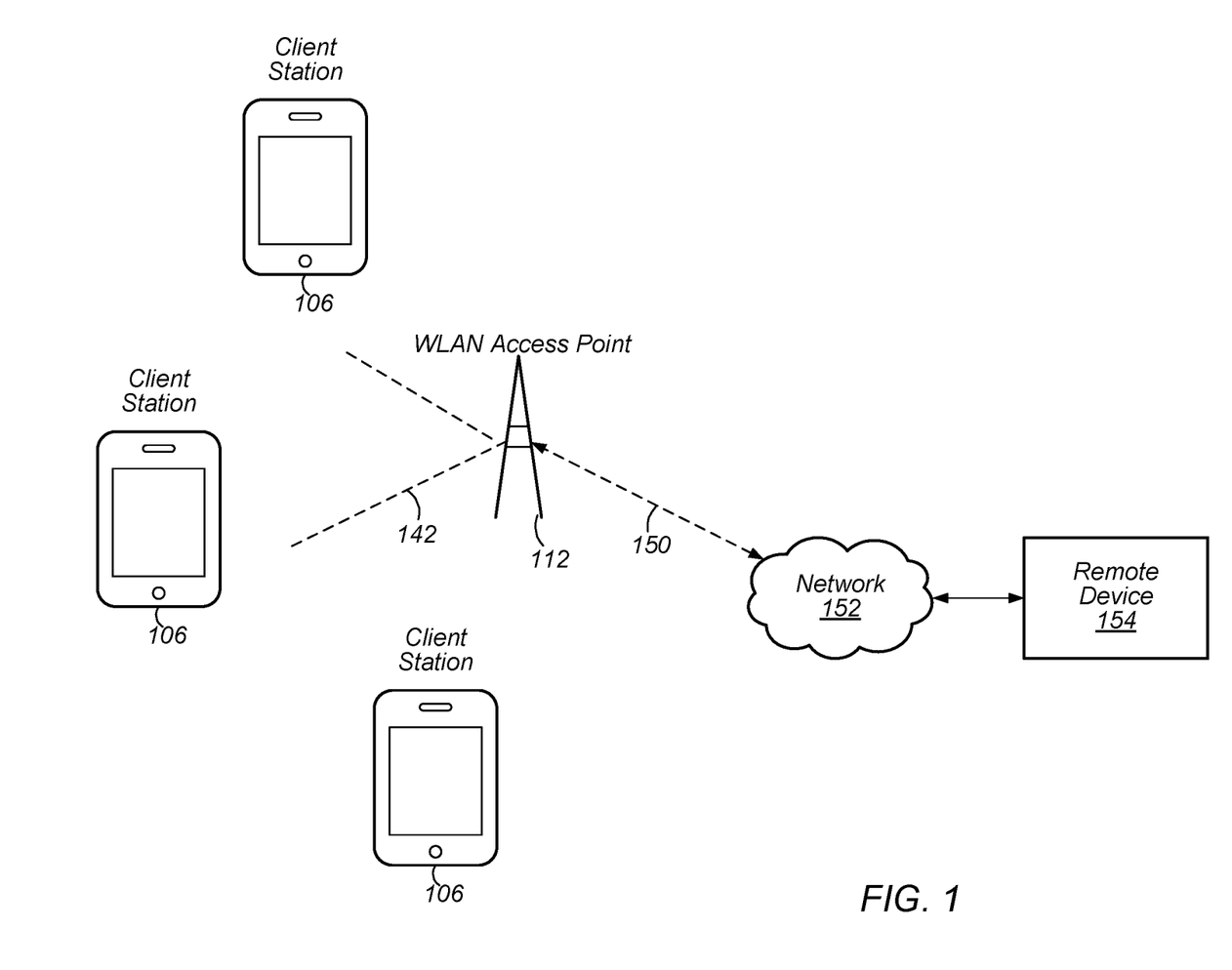
FIG. 1 illustrates an example WLAN communication system, according to some embodiments.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices, without use of the access point 112.

In some embodiments, as further described below, a wireless device 106 may be configured to perform methods for transitioning into a cluster, e.g., a NAN cluster. Further, wireless device 106 may be organized into a data cluster (e.g., a NAN data cluster) associated with the cluster and may perform methods to facilitate transitioning the data cluster to a new cluster.

Figure 2:
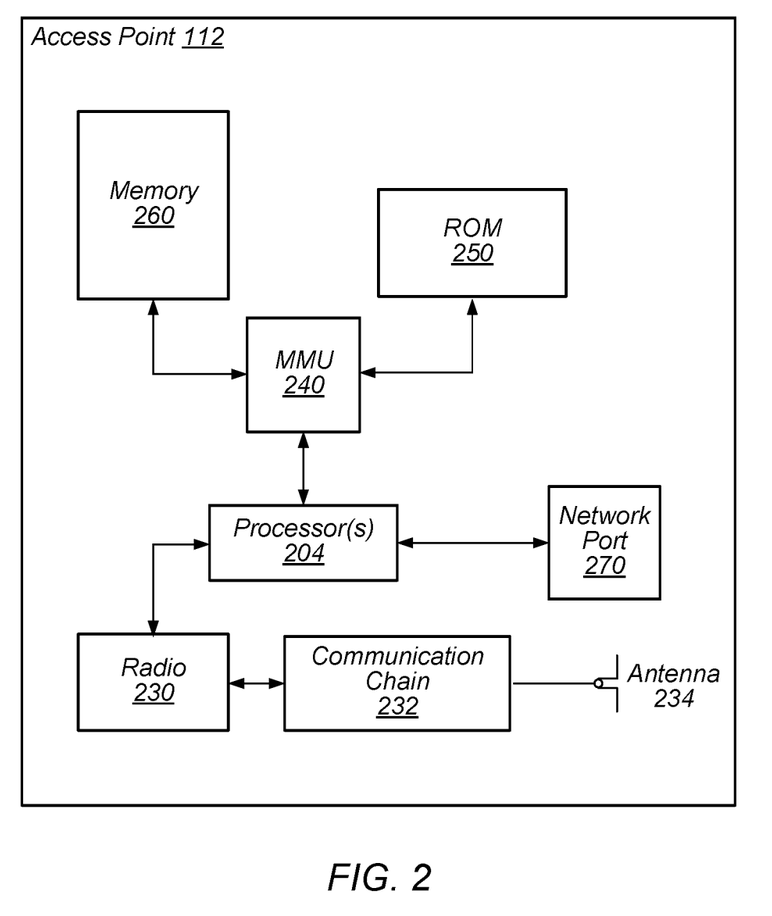
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods for transitioning one or more devices associated with a data cluster (e.g., a NAN data cluster) from a first cluster of devices (e.g., a NAN cluster) to a second cluster of devices. Further, AP 112 may be organized into the data cluster within the first cluster of devices and may perform methods to facilitate transitioning the data cluster to the second cluster of devices.

Figure 3:
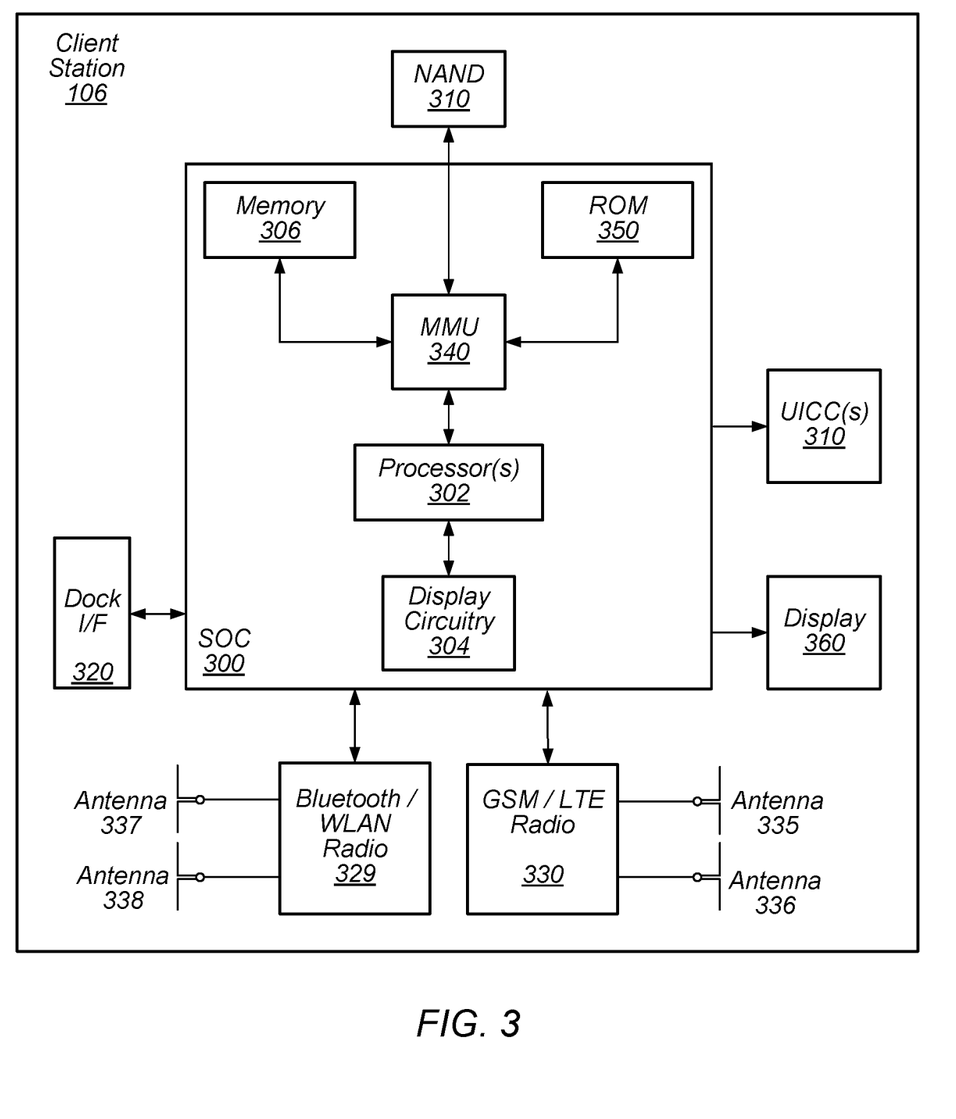
FIG. 3 illustrates an example simplified block diagram of a wireless station (UE), according to some embodiments.

FIG. 3—Client Station Block Diagram

FIG. 3 illustrates an example simplified block diagram of a client station 106. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods for one or more devices to transition into a cluster. For example, wireless device 106 may be organized into a data cluster (e.g., a NAN data cluster) within the cluster (e.g., a NAN cluster) and may perform methods to facilitate transitioning the data cluster to a new cluster.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocol

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each NAN device (or wireless station) may implement methods to ensure synchronization with a neighboring NAN device to which it is communicating. After two NAN devices have discovered each other (e.g., per NAN 1.0) they may implement a procedure to set up a NAN datapath between them in order to communicate. In some embodiments, when multiple NAN devices in a same neighborhood establish datapaths with each other it may be desirable (or beneficial) to group them together and coordinate their operations in order to facilitate power-efficient and low-latency communications. Two or more wireless stations (or NAN devices) may be organized into a NAN cluster to facilitate communication. A NAN cluster may provide benefits such as synchronization (e.g., to support concurrent service discovery and data communications) and robustness (e.g., to avoid a single point of failure). In some embodiments, a NAN cluster may refer to multiple peer wireless stations linked (e.g., in communication) via one or more NAN data links (e.g., a communication link between peer wireless stations (e.g., peer NAN devices)).

In certain scenarios, a NAN device may desire to join a NAN cluster. In some scenarios the NAN device may already participate in a first NAN cluster, but may transition to a second NAN cluster. For example, according to NAN 0.0.24 specifications, if the second NAN cluster has a higher cluster grade (CG) value than the first NAN cluster, the NAN device may terminate participation in the first (original) NAN cluster and join the second (new) NAN cluster having the higher cluster grade. However, if the NAN device (e.g., the transitioning device) is currently engaged in data exchange, e.g., data exchange characterized by high throughput and/or low latency, with a second peer NAN device, this data exchange may be interrupted or delayed by the transition. Additionally, potential individual transitions of each of multiple NAN devices from the first NAN cluster to the second NAN cluster may result in multiple such inefficiencies. Thus, the number or effect of data interruptions due to the transitioning of NAN devices between groupings (e.g., NAN clusters) in real time NAN data scenarios can be controlled and mitigated. Embodiments described herein may provide enhanced transitioning capabilities, e.g., an enhanced framework to facilitate the transitioning of one or more NAN devices to a NAN cluster.

In a NAN system operating according to embodiments described herein, a first NAN device may consider a second peer NAN device to be: (1) an "active data peer" if both the first NAN device and the second NAN device belong to the same NAN cluster and are determined to be engaged in data exchange with each other, including a high priority data exchange; or (2) an "idle data peer" if both devices do not belong to the same NAN cluster, or are determined not to be currently engaged in data exchange, or a high priority data exchange, with each other. A "NAN data cluster" may refer to a group of NAN devices within a NAN cluster, e.g., to a sub-cluster within a NAN cluster. More specifically, a NAN data cluster may refer to a collection of NAN devices and their active data peers, e.g., to a group of peer NAN devices belonging to the same NAN cluster and having at least one active datapath, e.g., a higher priority data path, with at least one member NAN device of the same NAN data cluster. Thus, a NAN cluster may include zero, one, or more than one NAN data cluster. A NAN device may belong to a NAN data cluster if it has one or more active data peers.

In other words, a NAN cluster may refer to multiple peer wireless stations linked (e.g., in communication) via one or more NAN data links (a communication link between peer wireless stations). Note that a peer wireless station may be a member of more than one NAN cluster. Further, a NAN data cluster may refer to a set of peer wireless stations in a common (e.g., same) NAN cluster that share a common base schedule (e.g., a NAN data cluster base schedule). In addition, peer wireless stations in a NAN data cluster may share at least one NAN data link (e.g., an active datapath) with another member wireless station within the NAN data cluster. Note that a peer wireless station may be a member of more than one NAN cluster; however, as noted previously, a NAN data link (e.g., a data link that includes an active datapath) belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

Figure 4A:
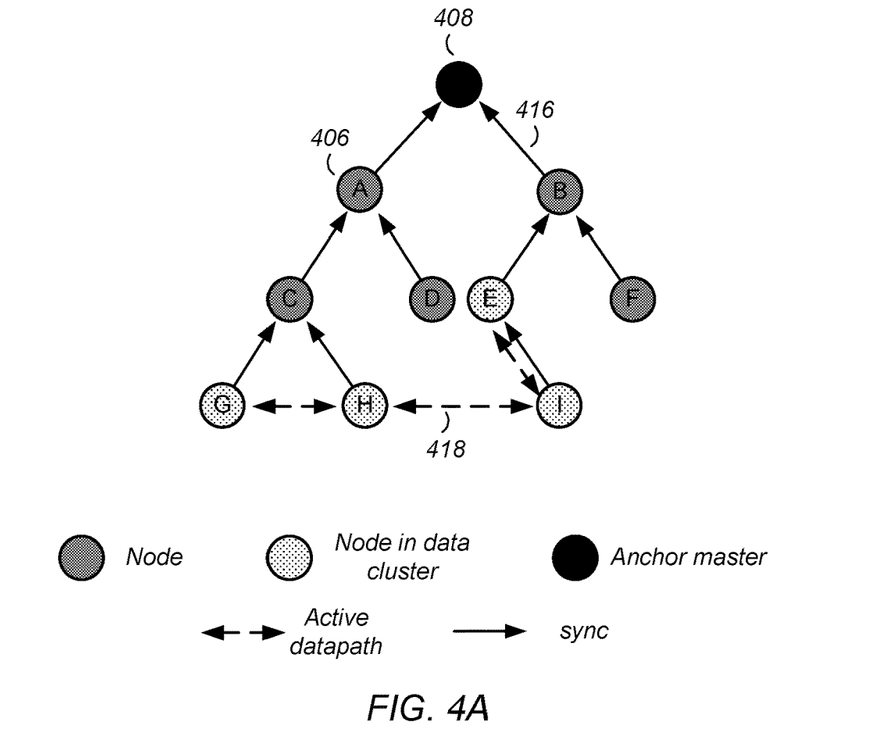
FIG. 4A illustrates an example of a NAN cluster including a NAN data cluster, according to some embodiments.

FIG. 4A illustrates an example of a cluster of devices including a data cluster, according to some embodiments. In the example diagram, each node 406 represents a wireless device (e.g., a NAN device). The cluster of devices (e.g., a NAN cluster) includes nodes 406 (e.g., nodes A, B, C, D, E, F, G, and H) and anchor master node 408. Nodes 406 may share a common clock with anchor master node 408 via synchronization beacons (or messages) 416. In addition, a subset of nodes 406 (e.g., nodes G, H, I, and E) may have established (or may be maintaining) an active data connection 418 (represented with a weighted double-sided arrow), such as a higher priority data connection, with at least one other device in the cluster of devices. Thus, the subset of nodes (e.g., nodes G, H, I, and E) may together form a data cluster of devices (e.g., a NAN data cluster). Note that every node having an active data connection with another node in the data cluster is also included in the data cluster.

A certain level and/or class of data exchange between two devices, e.g., data exchange determined to be higher priority by certain criteria, may be required for devices to be considered active data peers (e.g., have an active data connection or datapath) and hence for them to participate in a data cluster. In some embodiments, the criteria for determining whether a device (e.g., a NAN device) is engaged in higher priority data exchange for the purpose of determining other devices with which it maintains an active datapath, e.g., for the purpose of determining its active data peers and forming data clusters, may vary across implementations. For example, different devices, or types of devices, may use different standards for defining ongoing data exchange as higher priority or lower priority according to their own resources (e.g., device power level and/or transmission power requirements) and conditions (medium contention or interference levels). The type, quantity, and demands of the data exchange, such as factors like throughput and latency, and/or various other items, such as quality of service of the datapath, may be considered. In some embodiments, because these criteria may be implementation specific and may depend on the local conditions of a device, a first device may determine a relationship between it and a second device differently than the second device. For example, the first device may consider the second device to be an active data peer, whereas the second device may consider the first device to be an idle data peer. In such instances, the devices may exchange information related to the classification of the data peer and negotiate whether the devices will consider one another active or idle data peers.

NAN devices operating in a data cluster (active datapath peer devices) may coordinate the data cluster to minimize data interruptions. In some embodiments, it may be desirable to keep data clusters relatively small, e.g., less than 4, 8, 16, or 32 devices, depending on data requirements. In such embodiments, criteria for defining data exchange as higher priority may be stricter, e.g., a higher level of data exchange or more specific properties of data exchange may be required for this data exchange to be considered higher priority for the purpose of determining active data peers and forming data clusters.

Figure 4B:
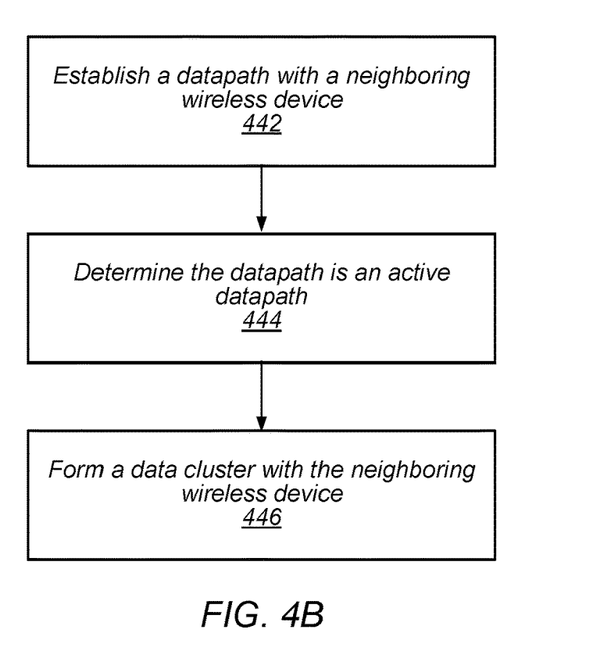
FIG. 4B illustrates a block diagram of an example method for forming a data cluster, according to some embodiments.

Turning to FIG. 4B, at 442, a wireless device, such as client station 106, may establish a datapath with a neighboring wireless device. The wireless devices may be associated with a cluster of devices. In some embodiments, the cluster may be or include a Neighbor Awareness Networking (NAN) cluster.

At 444, the wireless device may determine that the datapath includes an active datapath. In some embodiments, the determination may be based, at least in part, on conditions of the wireless device. In some embodiments, the neighboring wireless device may be an active data peer of the wireless device. In some embodiments, the wireless device may determine the neighboring wireless device is an active data peer based, at least in part, on determining that the active datapath includes a high priority data exchange. In some embodiments, a priority of a data exchange may be based, at least in part, on at least one of device power level, transmission power requirements, medium contention; and/or interference levels. In some embodiments, the conditions of the wireless device may include at least one of throughput requirements of the datapath, latency requirements of the datapath, and/or quality of service requirements of the datapath.

At 446, in response to determining that the datapath includes an active datapath, the wireless device may form a data cluster with the neighboring wireless device. In some embodiments, the data cluster may be or include a NAN data cluster. In some embodiments, to form the data cluster, the wireless device may notify the neighboring wireless device of the active datapath and establish a schedule for the active datapath with the neighboring wireless device.

In some embodiments, the wireless device may receive a cluster transition notification from the neighboring wireless device, determine a time of transition based, at least in part, on a size of the data cluster, and transition to the other cluster concurrently with the neighboring wireless device. In some embodiments, the cluster transition notification may indicate that the neighboring wireless device will perform a cluster transition from the cluster of devices to another cluster of devices having a higher cluster grade than the cluster of devices. In some embodiments, the cluster transition notification may be received via a service discovery frame that includes at least the cluster transition notification. In some embodiments, the service discovery frame may be one of a unicast frame, a multicast frame, and/or a broadcast frame. In some embodiments, to transition to the second cluster, the wireless device may transition to the second cluster in a first discovery window after the transition time.

Data Cluster Transition Procedure

In some scenarios, a NAN device may desire to transition from a first NAN cluster to a second NAN cluster. A NAN device belonging to a first NAN cluster may identify a second NAN cluster, e.g., by receiving a NAN beacon from a wireless device associated with (or in) the second NAN cluster. The NAN device may compare certain NAN cluster properties, e.g., cluster grade values, to determine if a transition is desirable.

For example, if the second NAN cluster has a higher cluster grade value than the first NAN cluster, the NAN device may desire to transition to the second NAN cluster. The NAN device may either transition individually or in conjunction with a NAN data cluster. In some embodiments, if the NAN device does not belong to a NAN data cluster within the first NAN cluster, it may transition to the second NAN cluster individually as indicated by NAN 1.0 specification according to the prior art. Conversely, if the NAN device is a member of a NAN data cluster as defined herein, then the NAN device may initiate a transition procedure so that the other NAN devices in its data cluster may transition to the new NAN cluster together. Thus, a data cluster may be able to perform timer synchronization function (TSF) changes (e.g., NAN cluster merges), whereby multiple NAN devices in a data cluster in a first NAN cluster may transition into a second NAN cluster as a group.

To transition a data cluster from a first NAN cluster to a second NAN cluster, the NAN device (e.g., the triggering device) may initiate a transitioning procedure. The triggering device may operate to distribute a transition notification and/or transition information to each of its active data peers. In some embodiments, a unicast frame may include this information. In some embodiments, the information may be included in a multicast or broadcast frame, or may be a unicast service discovery frame (SDF). The unicast frame may contain a NAN data cluster transition information element (IE). Note that the transition IE can be sent via a unicast, multicast, and/or broadcast frame and such a frame may be a NAN service discovery frame (SDF, which can be unicast, multicast, or broadcast). The transition IE may be usable to communicate the details of the transition, such as information concerning the second (destination) NAN cluster as well as the time at which the transition may be scheduled to take place, to other NAN devices in the data cluster. For example, the transition IE may contain the cluster discovery attribute corresponding to the second (destination) NAN cluster, as well as a transition timer synchronization function (TSF). Alternatively, the cluster discovery attribute may be appended to transition frames, together with the transition IE. The transition TSF may indicate a future time at which the data cluster may execute the transition. The transition TSF may also provide transition identification (ID) information usable for distinguishing the transitioning attempt from similar transitioning attempts.

The time of transition, e.g., the transition TSF, may be calculated according to various methods or procedures. For example, the size of the data cluster may influence the determination of the transition TSF; for larger data clusters, a more distant time window may be desired to allow time for transition information to be propagated throughout the data cluster. In some embodiments, it may be assumed that a maximum distance (e.g., hop count) between any two NAN devices in a NAN data cluster is small, e.g., less than a threshold value N, in order to simplify calculation of the transition TSF. Thus, the transition TSF may be calculated using the following equation: transition_TSF=current_TSF+ (N*spare_factor)*DW_period, where, for example, N may be given a value of 4, the DW_period may be valued at 512 time units, and the spare factor may be used to allow for some additional implementation specific spare time, such as in cases where the N value being used is deemed small. In addition, the current_TSF value may be according to the current NAN cluster time base, and before the time transition is being made. The triggering NAN device may perform this calculation upon triggering or initiating a transition procedure.

In some embodiments, an alternative method for calculating transition TSF may be used. In this method or procedure, each device in a data cluster may monitor the maximum distance between it and the farthest device in the data cluster (based on hop count). For example, returning to FIG. 4A, this variable hop count value would be 3 for nodes E and G (node E is 3 hops from node G) and 2 for nodes H and I (node E is 2 hops from node H, node G is 2 hops from node I). To calculate these values, algorithms like a link-state routing protocol or distance vector routing algorithm may be used, where nodes (e.g., NAN devices) may be considered like routers in a data network. Each device may also advertise hop counts from it to any/all of its peer devices within the data cluster, as well as a shortest hop count from it to any/all of the peer devices' peers. Each triggering node may then determine the shortest distance (e.g., hop count) to the farthest node in the NAN data cluster. Then the value N may be set to this determined shortest distance in the equation: transition_TSF=current_TSF+ (N*spare_factor)*DW_period.

Each of the other NAN devices in the NAN data cluster may receive a notification from the triggering NAN device, which may contain transition information such as a transition IE as described above. When a NAN device receives this information, it may determine whether it has already received an indication of this transition. For example, the NAN device may compare the transition ID to other identification information received earlier; if the NAN device determines it has already received information regarding this transition, it may disregard the notification, e.g., the transition frame, which may be unicast, multicast, or broadcast. Conversely, if the NAN device determines that the notification is its first notification of the transition, it may process and/or record information regarding the transition, such as the transition ID, and may convey the transition information (e.g., the unicast frame with the transition IE and cluster discovery attribute) to each of its active data peers. In this way the transition information may be propagated throughout the NAN data cluster so that the NAN devices included in the NAN data cluster may cooperatively transition to the new NAN cluster.

In some implementations, the NAN devices in the NAN data cluster may perform the transition in the discovery window (DW) immediately following the transition TSF. In the discovery window, the devices may begin to advertise their updated cluster information. In some embodiments, a second transition procedure may take place during the processing of the first transition. For example, a NAN device in the data cluster may trigger a second transition or may receive an indication of a second transition before the transition TSF of the first transition is reached. In such embodiments, the transition procedure with the lower TSF transition value may take precedence. Thus, the transition scheduled to be executed at an earlier time may be used. In some embodiments, once the transition has been successfully performed, the other (later) transition may be initiated. After the NAN data cluster has completed a transition, it may operate in conjunction with the destination NAN cluster.

Figure 5A:
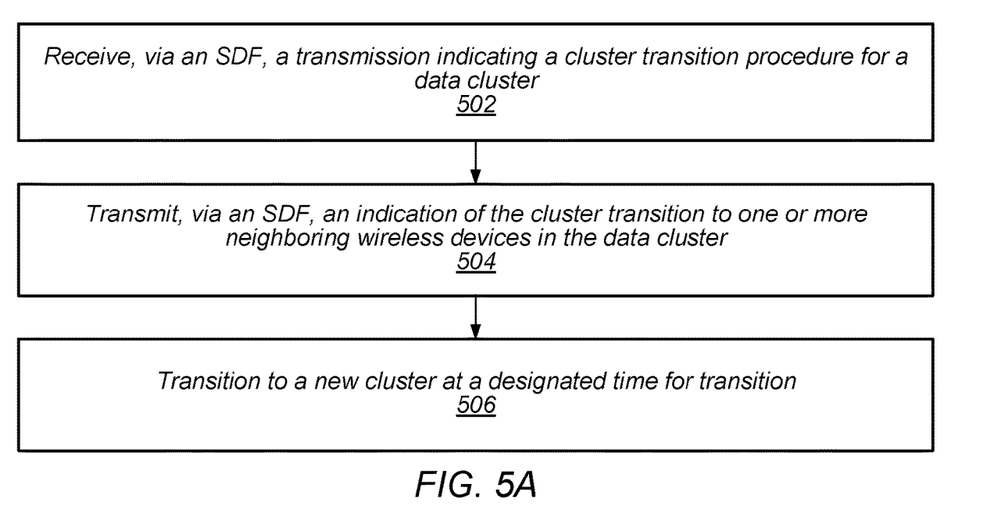
FIG. 5A illustrates a block diagram of an example method for transitioning a wireless device associated with a data cluster from a first cluster of wireless devices to a second cluster of wireless devices, according to some embodiments.

FIG. 5A illustrates a block diagram of an example of a method for transitioning a wireless device associated with a data cluster (e.g., a NAN data cluster) from a first cluster (e.g., a NAN cluster) of wireless devices to a second cluster of wireless devices, according to some embodiments. The method shown in FIG. 5A may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 502, a wireless device may receive a cluster transition notification from a neighboring wireless device, indicating a cluster transition procedure for a data cluster. Thus, the cluster transition notification may indicate the neighboring wireless device's intent to transition from a current cluster of devices to a new cluster of devices. The wireless device and the neighboring wireless device may be included in the current cluster of devices (e.g., a NAN cluster as described above) with other neighboring wireless devices. In addition, the wireless device and the neighboring wireless device may have previously established an active datapath and may be included in (or formed) the data cluster (e.g., a NAN data cluster). Thus, to minimize data interruptions, the cluster transition procedure for the data cluster may include devices in the data cluster transitioning substantially concurrently from the first cluster of devices to the second cluster of devices.

In some embodiments, the cluster transition notification may be included in a unicast frame, a multicast frame, and/or a broadcast frame. In some embodiments, the frame may be a service discovery frame. In some embodiments, the cluster transition notification may be indicated via (or may be) a transition information element and the transition information element may include information regarding the new (destination) cluster of devices (e.g., an identification of the new cluster, such as a cluster discovery attribute, and/or other cluster information, such as cluster grade) as well as a transition timer synchronization function (TSF). In some embodiments, the transition TSF may indicate a time of (or a time until) transition. In some embodiments, the transition may occur in a discovery window immediately following the transition TSF. In some embodiments, the transition TSF may also provide transition identification (ID) information usable for distinguishing the transitioning attempt from similar transitioning attempts. In some embodiments, the TSF may be determined (or calculated) as described above.

In some embodiments, the data cluster may include the wireless device and the neighboring wireless device. In addition, the data cluster may include any additional neighboring wireless device included in the cluster of devices with which the wireless device or the neighboring wireless device has established an active datapath. Note that all wireless devices included in the data cluster may be members of the cluster of devices as well.

At 504, the wireless device may transmit an indication of the cluster transition to one or more neighboring wireless devices in the data cluster (e.g., a subset of the other neighboring wireless devices in the current cluster of devices). In some embodiments, the wireless device may have an active datapath with the one or more neighboring wireless devices. In addition, the one or more neighboring wireless devices may be a subset of wireless devices included in the current cluster of devices.

In some embodiments, prior to transmitting the indication, the wireless device may determine if information regarding the transition notification to the new cluster of devices has been previously received. In some embodiments, the wireless device may ignore the transition notification if the wireless device determines that it has been previously received.

In some embodiments, the wireless device may transmit a unicast frame including the transition information element and/or other information regarding the transition to each of the one or more neighboring wireless devices. In some embodiments, if the wireless device received a service discovery frame at step 502, the wireless device may forward (or transmit) the service discovery frame to each of the one or more neighboring wireless devices.

At 506, the wireless device may transition to the new cluster of devices. In some embodiments, the transition may occur at a time specified in a transition TSF received from the neighboring wireless device. In addition, the neighboring wireless device, as well as each of the one or more neighboring wireless devices, may all be configured to transition concurrently with the wireless device (e.g., in a discovery window immediately following the transition TSF).

Figure 5B:
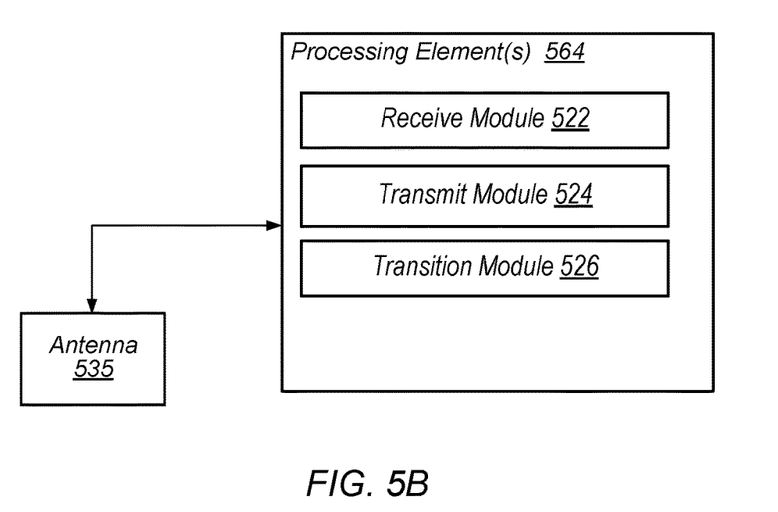
FIG. 5B illustrates an example of a processing element including modules for transitioning a wireless device associated with a data cluster from a first cluster of wireless devices to a second cluster of wireless devices, according to some embodiments.

FIG. 5B illustrates an example of a processing element including modules for transitioning a wireless device associated with a data cluster from a first cluster of wireless devices to a second cluster of wireless devices, according to some embodiments. In some embodiments, antenna 535 may be coupled (directly or indirectly) to processing element 564. The processing element may be configured to perform the method described above in reference to FIG. 5A. In some embodiments, processing element 535 may include one or more modules, such as modules (or circuitry) 522-526, and the modules (or circuitry) may be configured to perform various operations of the method described above in reference to FIG. 5A. In some embodiments, the processing element may be included in a wireless device such as client station 106. In other embodiments, the processing element may be included in a radio (or modem) or as a baseband processor of a radio (or modem) of a wireless device, such as client station 106. As shown, the modules may be configured as follows.

In some embodiments, processing element 564 may include a receive module 522 configured to receive (or generate instructions to receive) a transition notification from a neighboring wireless device indicating a cluster transition procedure for a data cluster. Thus, the transition notification may indicate the neighboring wireless device's intent to transition from a current cluster of devices to a new cluster of devices. A wireless device that includes the processing element and the neighboring wireless device may be included in the current cluster of devices (e.g., a NAN cluster as described above) with other neighboring wireless devices. In addition, the wireless device and the neighboring wireless device may have previously established an active datapath and may be included in (or formed) the data cluster (e.g., a NAN data cluster). In other words, the processing element may have generated instructions that established an active datapath with the neighboring wireless device.

In some embodiments, processing element 564 may include a transmit module 524 configured to transmit (or generate instructions to transmit) an indication of the cluster transition to one or more neighboring wireless devices in the data cluster (e.g., a subset of the other neighboring wireless devices in the current cluster of devices). In some embodiments, the processing element may have established (or generated instructions that established) an active datapath with each neighboring wireless device of the one or more neighboring wireless devices.

In some embodiments prior to transmitting the indication, the processing element may determine if information regarding the transition notification to the new cluster of devices has been previously received. In some embodiments, the processing element may ignore (or disregard) the transition notification if the processing element determines that it has been previously received.

In some embodiments, the processing element may transmit (or generate instructions to transmit) a unicast frame including the transition information element and/or other information regarding the transition to each of the one or more neighboring wireless devices. In some embodiments, if the processing element received a service discovery frame at step 502, the processing element may forward (or transmit or generate instructions to forward or transmit) the service discovery frame to each of the one or more neighboring wireless devices.

In some embodiments, processing element 564 may include a transition module 526 configured to transition (or generate instructions to transition) the wireless device to the new cluster of devices. In some embodiments, the transition may occur at a time specified in a transition TSF received from the neighboring wireless device. In addition, the neighboring wireless device, as well as each of the one or more neighboring wireless devices, may all be configured to transition concurrently with the wireless device (e.g., in a discovery window immediately following the transition TSF).

It is apparent for those skilled in the art that, for the particular processes of the modules (or circuitry) described above (such as modules 522, 524, and 526) reference may be made to the corresponding operations (such as operations 502, 504, and 506, respectively) in the related process embodiment sharing the same concept and the reference is regarded as the disclosure of the related modules (or circuitry) as well. Furthermore, processing element 564 may be implemented in software, hardware or combination thereof. More specifically, processing element 564 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 564 may be implemented as a general-purpose processor such as a CPU, and therefore each module can be implemented with the CPU executing instructions stored in a memory which perform a respective operation.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a memory; and
a processing element in communication with the memory, wherein the processing element is configured to:
  establish a datapath with a neighboring wireless device, wherein the apparatus and the neighboring wireless device are associated with a cluster of devices;
  determine that the datapath comprises an active datapath based at least in part on conditions of the apparatus, wherein the conditions include at least throughput requirements of the datapath;
form, in response to determining that the datapath comprises an active datapath, a data cluster with the neighboring wireless device;
  receive a cluster transition notification from the neighboring wireless device, wherein the cluster transition notification indicates that the neighboring wireless device will perform a cluster transition from the cluster of devices to another cluster of devices having a higher cluster grade than the cluster of devices;
  determine a time of transition based, at least in part, on a size of the data cluster; and
  transition to the other cluster concurrently with the neighboring wireless device.

2. The apparatus of claim 1,
wherein the cluster comprises a neighbor awareness networking (NAN) cluster; and
wherein the data cluster comprises a NAN data cluster.

3. The apparatus of claim 1,
wherein the neighboring wireless device comprises an active data peer of the apparatus.

4. The apparatus of claim 1,
wherein the conditions of the apparatus further include at least one of:
  latency requirements of the datapath; or
  quality of service requirements of the datapath.

5. The apparatus of claim 1,
wherein the processing element is further configured to:
  establish a schedule for the data cluster with the neighboring wireless device.

6. The apparatus of claim 1,
wherein the cluster transition notification is received via a service discovery frame that includes at least the cluster transition notification, wherein the service discovery frame comprises one of a unicast frame, a multicast frame, or a broadcast frame.

7. The apparatus of claim 1,
wherein to transition to the other cluster, the processing element is further configured to:
  transition to the other cluster in a first discovery window after the transition time.

8. A non-transitory computer readable memory medium storing program instructions executable by a processor of a wireless device to:
  generate instructions to establish a datapath with a neighboring wireless device, wherein the wireless device and the neighboring wireless device are associated with a cluster of devices;
  determine that the datapath comprises an active datapath based at least in part on conditions of the wireless device, wherein the conditions include at least throughput requirements of the datapath;
  form, in response to determining that the datapath comprises an active datapath, a data cluster with the neighboring wireless device, wherein the data cluster is associated with a base schedule that indicates further availability windows in which the wireless device and neighboring wireless device use to maintain synchronization;
  generate instructions to cause a cluster transition notification to be transmitted to the neighboring wireless device, wherein the cluster transition notification indicates that the wireless device will perform a cluster transition from the cluster of devices to another cluster of devices having a higher cluster grade than first cluster of devices; and
  transition, at a time of transition, to the other cluster of devices concurrently with the neighboring wireless device.

9. The non-transitory computer readable memory medium of claim 8,
wherein to form the data cluster, the program instructions are further executable to:
  generate instructions to cause the neighboring wireless device to be notified of the active datapath; and
  generate instructions to establish a schedule for the active datapath with the neighboring wireless device.

10. The non-transitory computer readable memory medium of claim 8,
wherein the cluster comprises a neighbor awareness networking (NAN) cluster; and
wherein the data cluster comprises a NAN data cluster.

11. The non-transitory computer readable memory medium of claim 8,
wherein the neighboring wireless device comprises an active data peer of the wireless device based, at least in part, on determining that the active datapath includes a high priority data exchange.

12. The non-transitory computer readable memory medium of claim 11,
wherein a priority of a data exchange is based, at least in part, on at least one of:
device power level;
transmission power requirements;
medium contention; or
interference levels.

13. The non-transitory computer readable memory medium of claim 8,
wherein the conditions of the wireless device further include at least one of:
latency requirements of the datapath; or
quality of service requirements of the datapath.

14. The non-transitory computer readable memory medium of claim 8,
wherein the cluster transition notification is included in a service discovery frame that comprises one of a unicast frame, a multicast frame, or a broadcast frame.

15. A wireless device, comprising:
at least one antenna;
at least one radio configured to perform Wi-Fi communication with an access point;
at least one processor communicatively coupled to the at least one radio, wherein the wireless device is configured to perform data communications;
wherein the at least one processor is configured to:
establish a datapath with a neighboring wireless device, wherein the wireless device and the neighboring wireless device are associated with a cluster of devices;
determine that the datapath comprises an active datapath based at least in part on conditions of the wireless device, wherein the conditions include at least latency requirements of the datapath;
form, in response to determining that the datapath comprises an active datapath, a data cluster with the neighboring wireless device;
transmit a cluster transition notification to the neighboring wireless device, wherein the cluster transition notification indicates that the wireless device will perform a cluster transition from the cluster of devices to another cluster of devices having a higher cluster grade than first cluster of devices; and
transition, at a time of transition, to the other cluster of devices concurrently with the neighboring wireless device.

16. The wireless device of claim 15,
wherein the cluster comprises a neighbor awareness networking (NAN) cluster; and
wherein the data cluster comprises a NAN data cluster.

17. The wireless device of claim 15,
wherein the neighboring wireless device comprises an active data peer of the wireless device.

18. The wireless device of claim 15,
wherein the conditions of the wireless device further include at least one of:
throughput requirements of the datapath; or
quality of service requirements of the datapath.

19. The wireless device of claim 15,
wherein the cluster transition notification is transmitted via a service discovery frame that includes at least the cluster transition notification, wherein the service discovery frame comprises one of a unicast frame, a multicast frame, or a broadcast frame.

20. The wireless device of claim 15,
wherein to transition to the other cluster, the at least one processor is further configured to:
transition to the other cluster in a first discovery window after the transition time.

* * * * *